United States Patent
Jung

(10) Patent No.: US 10,247,224 B2
(45) Date of Patent: *Apr. 2, 2019

(54) REFRIGERATOR AND REFRIGERATOR DOOR

(71) Applicant: LG ELECTRONICS INC., Seoul (KR)

(72) Inventor: Jaehun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,909

(22) Filed: Jul. 9, 2018

(65) Prior Publication Data

US 2018/0313396 A1  Nov. 1, 2018

Related U.S. Application Data

(63) Continuation of application No. 15/274,004, filed on Sep. 23, 2016, now Pat. No. 10,018,218.

(30) Foreign Application Priority Data

Sep. 23, 2015  (KR) .................. 10-2015-0134690

(51) Int. Cl.
| | |
|---|---|
| A47B 96/04 | (2006.01) |
| F16B 47/00 | (2006.01) |
| F25D 23/02 | (2006.01) |

(52) U.S. Cl.
CPC .......... *F16B 47/003* (2013.01); *F25D 23/028* (2013.01); *F25D 2400/18* (2013.01)

(58) Field of Classification Search
CPC ...................................................... F25D 23/028
USPC .................................................. 312/401, 405
See application file for complete search history.

(56) References Cited

U.S. PATENT DOCUMENTS

| 7,984,955 B2 | 7/2011 | Jung |
| 2006/0265960 A1 | 11/2006 | Leimkuehler et al. |
| 2008/0143227 A1 | 6/2008 | Kim |

(Continued)

FOREIGN PATENT DOCUMENTS

| CN | 101206096 | 6/2008 |
| CN | 101680704 | 3/2010 |
| CN | 102869936 | 1/2013 |

(Continued)

OTHER PUBLICATIONS

Extended European Search Report in European Application No. 16189832.5, dated Feb. 14, 2017, 8 pages.

(Continued)

*Primary Examiner* — Matthew W Ing
(74) *Attorney, Agent, or Firm* — Fish & Richardson P.C.

(57) ABSTRACT

A refrigerator and refrigerator door in which the door includes a door panel that includes metal and that defines a first surface of the door and a second surface of the door. The door also includes a bending portion that is bent from the door panel toward a first side of the door panel and a cap panel that includes metal, that defines a third surface of the door and a fourth surface of the door, that is coupled to the door panel and a first surface of the bending portion, and that includes a recess. The door further includes a fixing member that is configured to press a second surface of the bending portion and that is coupled to the cap panel. The bending portion of the door is configured to be pressed between the cap panel and the fixing member.

9 Claims, 13 Drawing Sheets

(56) References Cited

U.S. PATENT DOCUMENTS

2010/0156260 A1  6/2010  Arzoz
2013/0293080 A1  11/2013  Kim

FOREIGN PATENT DOCUMENTS

| CN | 103383176 | 11/2013 |
| CN | 104344658 | 2/2015 |
| DE | 102010028414 A1 | 11/2011 |
| KR | 200160509 A1 | 11/1999 |
| KR | 2012011515 A1 | 2/2012 |
| WO | WO2015015355 A1 | 2/2015 |
| WO | WO2015043479 A1 | 4/2015 |

OTHER PUBLICATIONS

Korean Notice of Allowance in Korean Application No. 10-2015-0134690, dated Mar. 13, 2017, 1 page.
Office action in Chinese Application No. 201610849462.X, dated Dec. 4, 2018, 17 pages (with English Translation).

FIG. 12 (a)
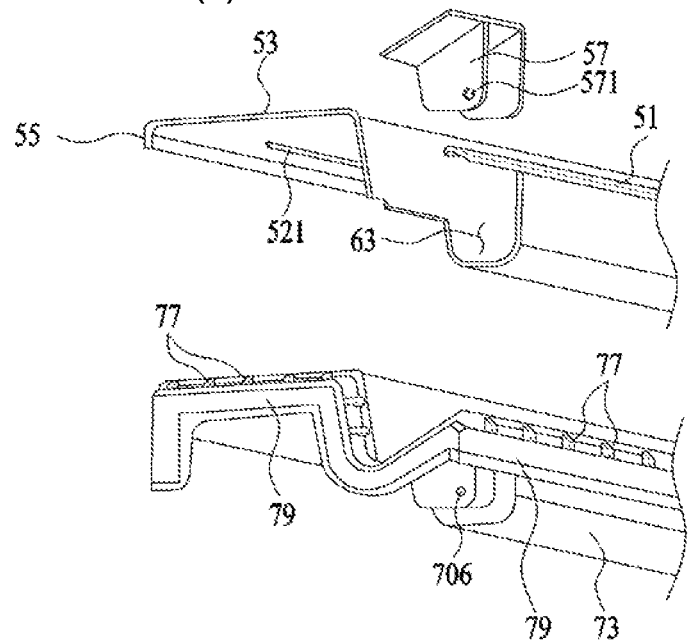
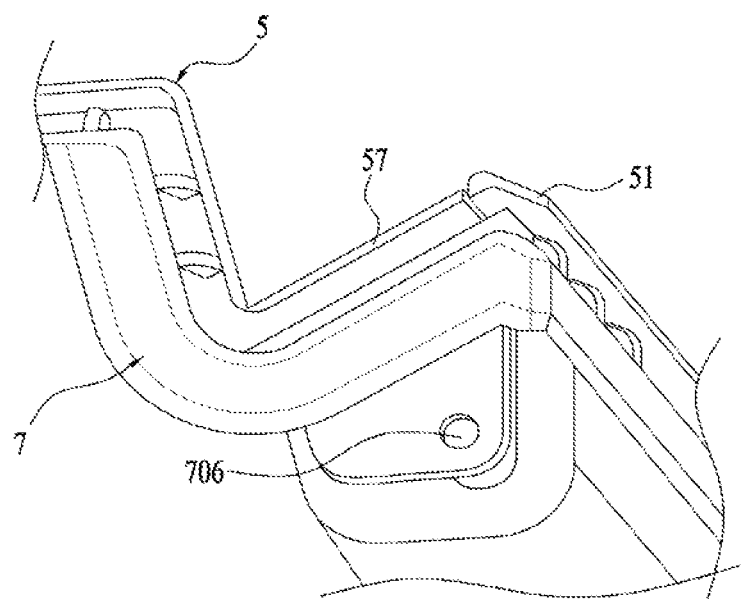
FIG. 12 (b)

REFRIGERATOR AND REFRIGERATOR DOOR

CROSS-REFERENCE TO RELATED APPLICATION

This application is a continuation of U.S. application Ser. No. 15/274,004, filed on Sep. 23, 2016, now allowed, which claims the benefit of earlier filing date and right of priority to Korean Patent Application No. 10-2015-0134690, filed on Sep. 23, 2015, the contents of which are hereby incorporated by reference in their entirety.

TECHNICAL FIELD

The present disclosure relates to a refrigerator and refrigerator door.

BACKGROUND

A refrigerator is an electric appliance configured to keep food stored in one or more storage compartments in low temperature by supplying cold air to the storage compartments. The storage compartments may usually include a refrigerator compartment for storing refrigerated food and a freezer compartment for storing frozen food.

SUMMARY

In one aspect, a refrigerator includes a cabinet, a storage compartment that is located in the cabinet and that defines an interior area, and a door configured to cover the interior area of the storage compartment. The door includes a door panel that includes metal and that defines a first surface of the door and a second surface of the door, and a bending portion that is bent from the door panel toward a first side of the door panel. The door also includes a cap panel that includes metal that defines a third surface of the door and a fourth surface of the door, that is coupled to the door panel and a first surface of the bending portion, and that includes a recess. The door further includes a fixing member that is configured to press a second surface of the bending portion and that is coupled to the cap panel. The bending portion of the door is configured to be pressed between the cap panel and the fixing member.

Implementation may include one or more of the following features. For example, the fixing member may include a pressing portion configured to press the bending portion. In this example, the pressing portion may include a plurality of ribs. The fixing member may include a support portion configured to support an inner surface of the door panel.

In some implementations, the bending portion may include a first bending portion that is bent from the second surface of the door panel toward the first side of the door panel and that is inclined at a first angle, a second bending portion that is bent from the second surface of the door panel toward the first side of the door panel and that is inclined at a second angle, and a third bending portion that is bent from the first surface of the door panel toward the first side of the door panel. In these implementations, the cap panel may include a first cap panel that is supported by the first bending portion and the third bending portion and a second cap panel that is supported by the second bending portion. Further, in these implementations, the first cap panel may include the recess, the recess may be extended in parallel to the first surface of the door, and a shape of the fixing member substantially corresponds to a shape of a first surface of the cap panel.

In addition, the cap panel may include a fixing projection that is projected from a first surface of the cap panel. The fixing member may include a fixing groove that is recessed in the fixing member, and the fixing projection may be configured to be inserted into the fixing groove.

In some examples, the fixing member may include a penetrating hole, and a portion of the cap panel may be exposed to an internal area of the door panel through the penetrating hole. In these examples, the portion of the cap panel may be exposed through the penetrating hole is coupled to a blowing agent provided in the door panel. Also, in these examples, the cap panel may include a fixing projection that is projected from a first surface of the cap panel, and the fixing projection may be exposed to an internal area of the door panel through the penetrating hole.

Further, the cap panel may be coupled to the fixing member using an adhesive or adhesive tape. The cap panel may include a die casting mold panel. The cap panel may include a press mold panel and, in this case, the fixing member may include a protecting portion that is configured to cover a cut surface of the cap panel. Also, the cap panel may include an extrusion molding panel.

In some implementations, the cap panel may include a fixing rib that is projected from a first surface of the cap panel and that is in parallel to the first surface of the door. In these implementations, the fixing member may include a fixing groove that is recessed on a first surface of the fixing member and that is in parallel to the first surface of the door, and the fixing rib may be configured to be inserted into the fixing groove.

In another aspect, a refrigerator door is configured to cover an interior area of a compartment. The door includes a door panel that includes metal and that defines a first surface of the door and a second surface of the door, and a bending portion that is bent from the door panel toward a first side of the door panel. The door also includes a cap panel that includes metal that defines a third surface of the door and a fourth surface of the door, that is coupled to the door panel and a first surface of the bending portion, and that includes a recess. The door further includes a fixing member that is configured to press a second surface of the bending portion and that is coupled to the cap panel. The bending portion may be configured to be pressed between the cap panel and the fixing member.

Implementations may include one or more of the features referenced in the application and summary. For example, the cap panel may include a die casting mold panel. Also, the cap panel may include a press mold panel.

BRIEF DESCRIPTION OF THE DRAWINGS

FIG. 12(a) is a diagram illustrating an example door of FIG. 10.

FIG. 12(b) is a diagram illustrating example components of the example door of FIG. 12(a).

Like reference numbers and designations in the various drawings indicate like elements.

DETAILED DESCRIPTION

Figure 1:
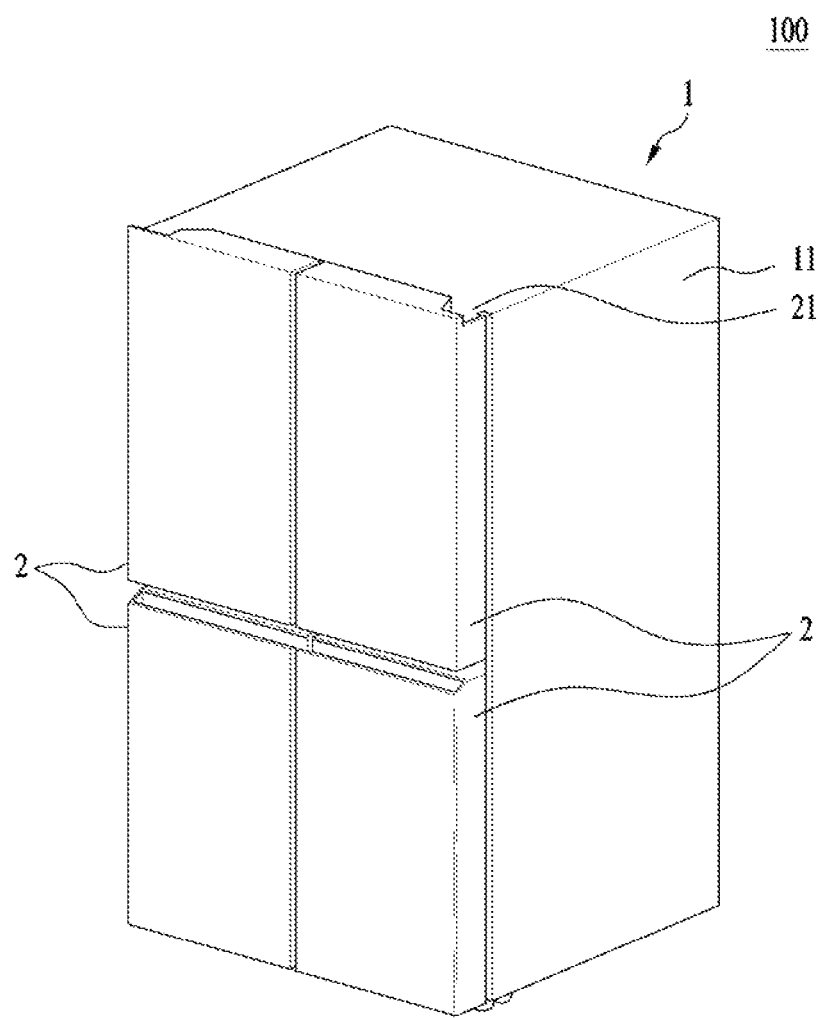
FIG. 1 is a diagram illustrating an example refrigerator.
Figure 2:
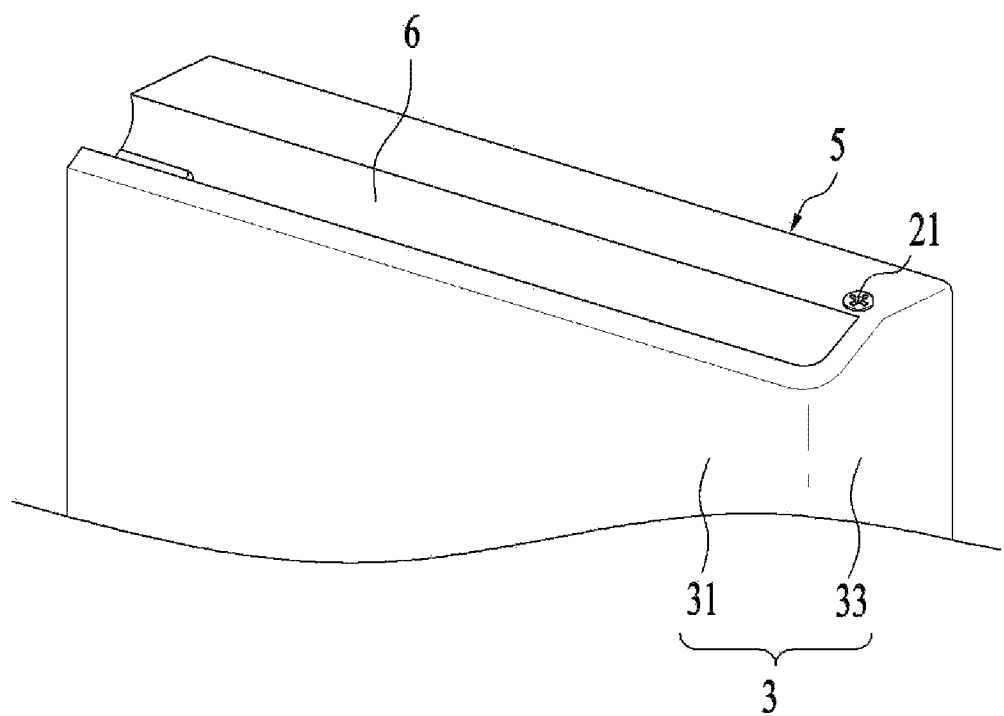
FIG. 2 is a diagram illustrating an example door of a refrigerator.
Figure 3:
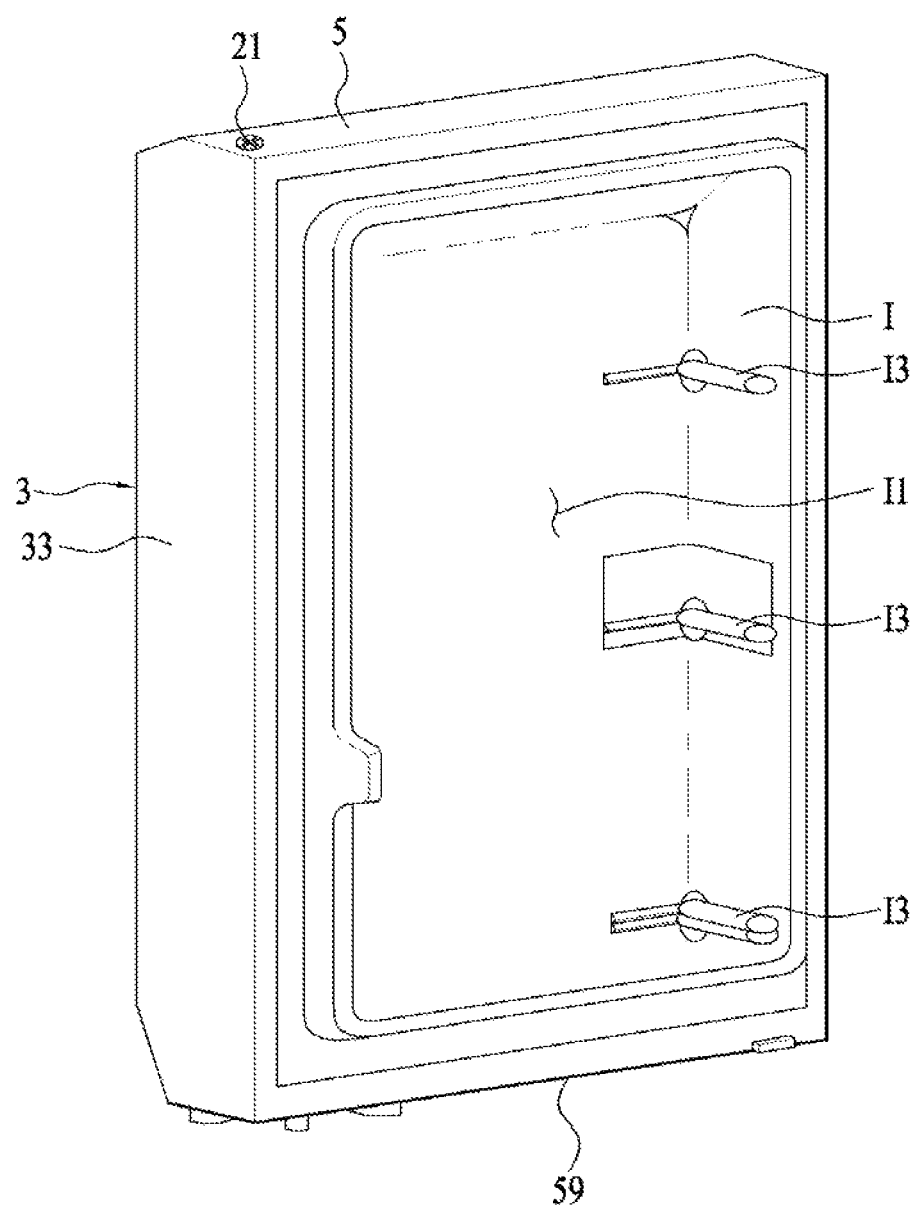
FIG. 3 is a diagram illustrating an example door of a refrigerator.
Figure 4:
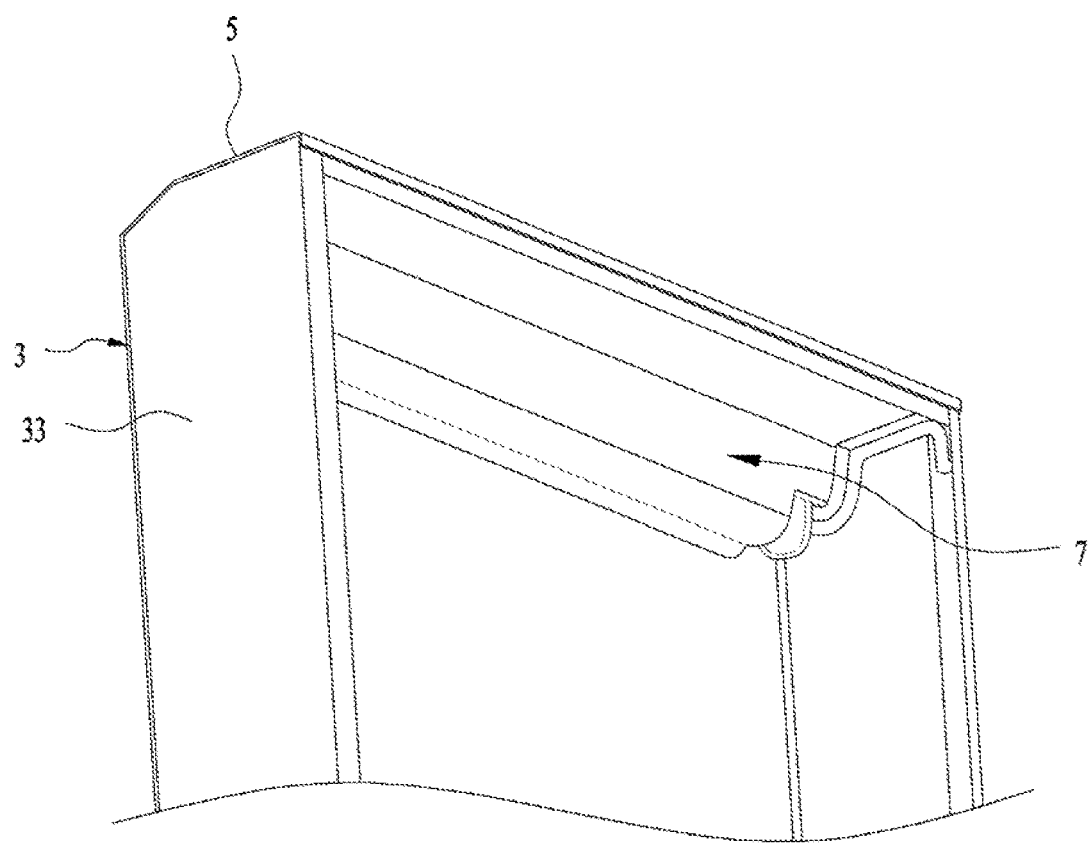
FIG. 4 is a diagram illustrating an example door of a refrigerator when a door inner case is not coupled to the door.

FIG. 1 illustrates an example refrigerator. FIGS. 2-3 illustrate an example door of a refrigerator. FIG. 4 illustrates an example door of a refrigerator when a door inner case is not coupled to the door.

In FIG. 1, a refrigerator 100 includes a cabinet 1 having a storage compartment and a door 2 for opening and closing the storage compartment.

The cabinet 1 defines an exterior appearance of the refrigerator and the exterior appearance or profile of a conventional refrigerator is cube-shaped. However, the shape of the cabinet 1 provided in the refrigerator of the present disclosure is not limited thereto and it may be diversely determined.

The cabinet includes an outer case 11 and an inner case. An insulating material may be filled between the outer case 11 and the inner case to prevent cold air inside the storage compartment from exchanging heat with external air.

The storage compartment is provided in the cabinet 1 and it is the space defined by the inner case. The storage compartment may include a freezer compartment provided with the cold air to be kept at temperatures under zero and a refrigerator compartment kept at preset temperatures lower than normal temperatures but above zero.

In some implementations, the freezer compartment may be provided in a lower portion of the cabinet 1 and the refrigerator compartment may be provided in an upper portion of the cabinet 1, in other words, on a top of the freezer compartment.

The storage compartment may communicate with the outside and the storage compartment in communication with the outside may be open and closed by the door 2. The refrigerator and freezer compartments can be open and closed by the door 2.

The door disclosed in this example can be applied not only to a refrigerator, but also other appliance. For example, the door described above can be used for any appliances, which includes a compartment, in order to close the compartment with the door.

Referring to FIG. 2, the door 2 is rotatably coupled to the cabinet 1. The door 2 includes a shaft 21 and the shaft 21 is connected by a hinge to rotatably couple the door 2 to one side of the cabinet 1.

The door 2 may be made of metal and includes a door panel 3 forming a front surface 31 and a lateral surface 33 of the door 2; a bending portion 4 bending from the door panel 3; a cap panel 5 supported to one surface of the bending portion 4 and defining an upper and lower surface of the door 2; and a recess 6 provided in the cap panel 5 to function as a handle.

The door panel 3 may include a front door panel 31 defining a front surface of the door; and a side door panel 33 extended from the front door panel 31 and bending backward.

The side door panel 33 may be provided in each of two opposite sides of the front door panel 31.

A cross section of the door panel 3 may be 'U'-shape. In this instance, the door panel 3 may have an open top, bottom, and back.

In some implementations, the door panel 3 may be fabricated by various methods. For example, the door panel 3 may be fabricated by molding a metal plate made by the press-die which has a simple appearance and low manufacturing cost. However, the door panel may be fabricated by other die methods.

The cap panel 5 defines an upper surface or a lower surface of the door 2 and has an opening which is covered with the top or bottom of the door panel 3.

When the cap panel 5 is provided on the top of the door panel 3, a handle of the door may be provided on the top of the door.

When the cap panel 5 is provided on the bottom of the door panel 3, the handle of the door may be provided on the bottom of the door.

In some implementations, the cap panel 5 is provided on the top of the door panel 3. In some implementations, the cap panel 5 is provided on the bottom of the door panel 3.

Referring to FIGS. 3 and 4, the refrigerator may further include an auxiliary cap panel 59 defining the upper or lower surface of the door 2.

In case the cap panel 5 covers either of the top and bottom of the door panel 3, the auxiliary cap panel 59 may cover the other portion of the door panel the cap panel 5 does not cover.

In some implementations, the refrigerator may further include a door inner case (I) provided in a rear surface of the door 2.

FIG. 4 illustrates the outer case having the door inner case (I) not insertedly fitted to. The outer case may be defined by the door panel, the cap panel and the auxiliary panel. Also, the outer case may be formed of metal.

The door inner case (I) includes a recessed portion I1 concavely recessed from the door 2; and a basket rest I3 provided in a lateral surface of the recessed portion I1 and resting a door basket.

The outer case is formed by arranging the cap panel 5 and the auxiliary panel 59 on the top and bottom of the door panel 3.

When the door inner case I is installed in the rear surface of the outer case, the space formed between the door panel 3 and the door inner case I may be filled with an insulating material such as polyurethane foam. Accordingly, the cold air inside the storage compartment may not exchange heat with external air via the door 2.

Figure 5:
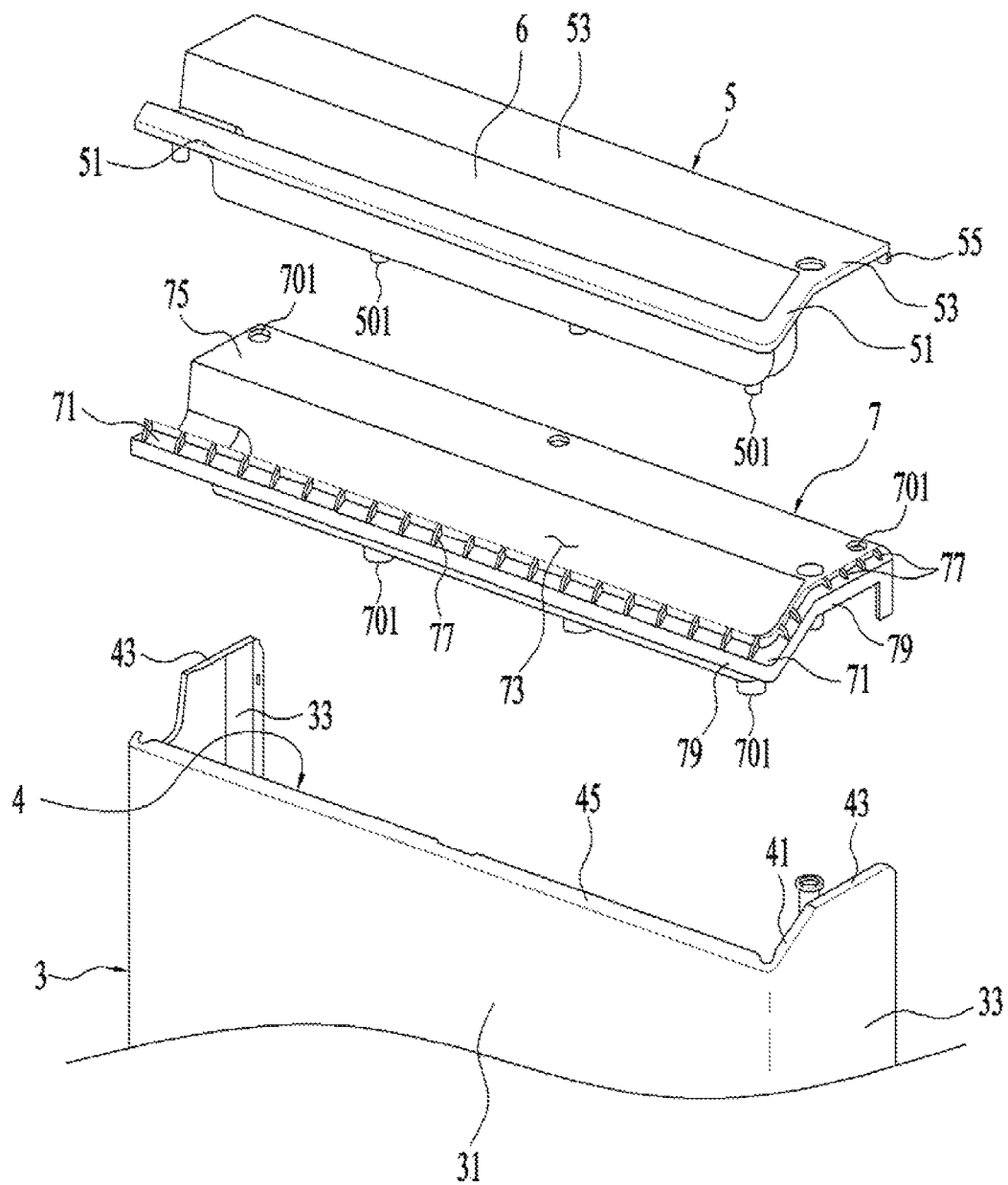
FIG. 5 is a diagram illustrating an example door of a refrigerator.
Figure 6:
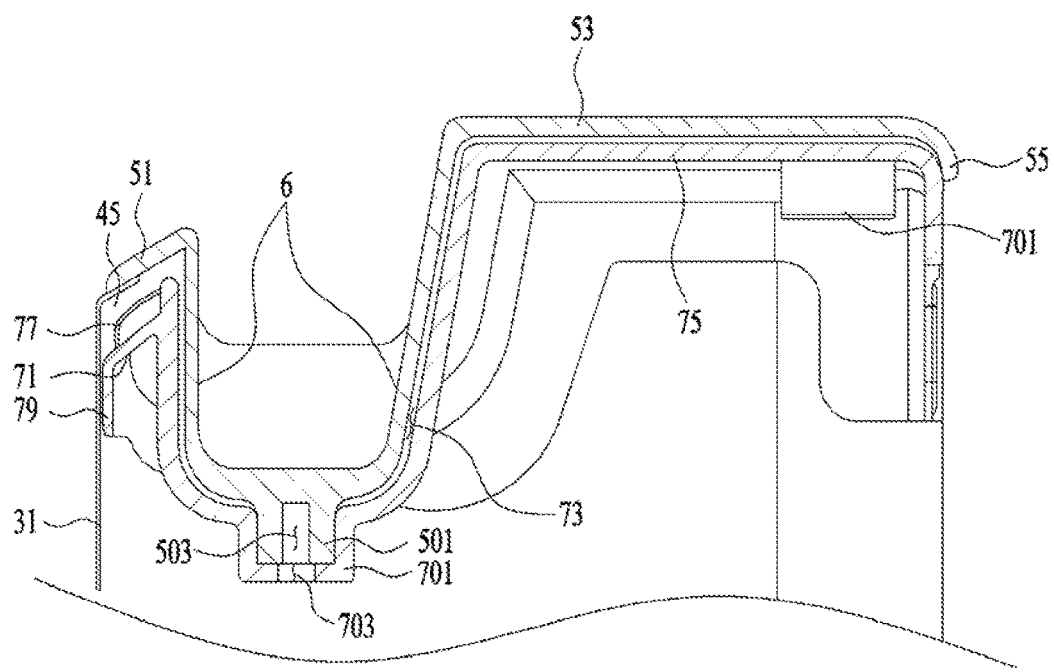
FIG. 6 is a diagram illustrating an example door of a refrigerator.

FIGS. 5-6 illustrate an example door of a refrigerator. Referring to FIGS. 5-6, one example door of a refrigerator is described. The bending portion 4 may be bending from the door panel 3.

The bending portion 4 may be provided on the top or bottom of the door panel 3.

In FIG. 5, the bending portion 4 is provided on the top of the door panel 3.

The bending portion 4 may include a first bending portion 41 bending from an upper surface of the side door panel 33 and inclined forward; a second bending portion 43 connected with the first bending portion 41 in parallel.

The first bending portion 41 and the second bending portion 43 may be vertically bending from the side door panel 33.

The bending portion 4 may further include a third bending portion 45 bending from an upper surface of the front door panel 31.

The angle formed by the third bending portion and the front door panel 31 may be equal to the angle formed by the first bending portion 41 and the front door panel 31.

The third bending portion 45 provided in the upper surface of the front door panel 31 is connected with a lower portion of the first bending portion 41 inclinedly provided in the side door panel 33 and the second bending portion 43 is horizontally connected with the upper surface of the inclined first bending portion 41.

The cap panel 5 may be fixed to the top or bottom of the door panel 3 to define the upper or lower surface of the door.

The cap panel 5 may be supported to one surface (or an outer surface or an upper surface) of the bending portion 4.

The overall area of the cap panel 5 is smaller than an upper or lower opening of the door panel 3.

Also, while the overall area of the cap panel 5 is smaller than an upper or lower opening formed by the front door panel 31 and the two side door panels 33, the cap panel 5 may be supported by the bending portion 4 projected inward from the door panel 3.

The cap panel 5 may include a first cap panel 51 inclined forward; and a second cap panel 53 parallel with the first cap panel 51.

The inclined surface of the first cap panel 51 is arranged forward and the second cap panel 53 is horizontally bending in a state of being connected with upper end of the first cap panel 51.

The first cap panel 51 may be inclined forward at the same angle as the first bending portion 41 is inclined.

The first cap panel 51 may be provided in the upper surface of the first bending portion 41 and the upper surface of the first bending portion 41.

The first cap panel 51 may be provided in an upper surface of the second bending portion 43 and supported by the second bending portion 43.

The cap panel 5 may further include the third cap panel 55 inclined backward and connected to one end of the second cap panel 53.

The second cap panel 53 is supported by the second bending portion 43 and the first cap panel 51 is supported by the first and second bending portions 41 and 45. The third cap panel 55 is supported by the rear surface of the door panel 3. Then, the cap panel 5 arranged on the top of the door panel 3 can be fixed stably not to move forward and backward.

The recess 6 may be provided in the cap panel 5 and function as the handle when the user opens and closes the door 2.

The recess 6 may be concavely recessed from the cap panel 5 and especially in the first cap panel 51. The recess 6 may be recessed longitudinally in a right-and-left direction.

Also, the recess 6 has a groove as deep as a human finger and the groove has certain length in a right-and-left direction with respect to the door.

The recess 6 is open and the open area may be toward a center of two doors. The open area may be provided in the portion opposite to the shaft 21.

The refrigerator may include a fixing member 7 fixed to the cap panel 5 and pressing the other surface of the bending portion 4.

One surface of the bending portion 4 is in contact with the cap panel and the other surface of the bending portion is in contact with the fixing member 7. The bending portion is pressed between the cap panel and the fixing member.

The fixing member 7 may be provided in an internal space of the door 2 (or the door panel 3).

In some implementations, the fixing member 7 may include plastic. The fixing member 7 can be made by injection molding.

The injection mold means the die method for fabricating a molded product made by injecting and chilling a polymer material an empty space formed between core and cavity, after pressing the molten or half molten polymer material at a high pressure.

In some implementations, the polymer material used for the fixing member 7 is made of ABS resin.

An upper surface of the fixing member 7 may have a corresponding shape to an inner surface of the cap panel 5.

The fixing member 7 includes an inclined surface 71 corresponding to the first cap panel 51; a recess inserting portion formed in a corresponding shape to the recess 6; and a flat surface 75 corresponding to a flat surface of the second cap panel 53.

The recess inserting portion 73 may be provided in the inclined surface 71 of the fixing member 7.

The recess inserting portion 73 may include a pressing portion 77 provided in a front or side area and a support portion 79 which will be described in detail later.

The flat surface 75 is located behind the recess inserting portion 73.

Also, the flat surface 75 may have a rectangular shape, viewed above, to support the door panel by contacting with an inner circumferential surface of the door panel 3. Accordingly, the fixing member 7 support the inner circumferential surface of the door panel 3 to make a cross section of the door panel have a rectangular shape.

The fixing member 7 may include a pressing portion 77 pressing the other surface (or the lower surface) of the bending portion 4 to fix the cap panel 5 supported by the upper surface of the bending portion 4 to the door panel 3.

The bending portion 4 may be pressed between the cap panel 5 and the pressing portion 77.

The cap panel 5 is located on the upper surface of the bending portion 4 and the pressing portion 77 presses the lower surface of the bending portion 4, only to fix the cap panel 5 to the door panel 3.

The pressing portion 77 may press the other surface of the bending portion 41, 43 and 45.

The pressing portion 77 may be projected from an edge of the fixing member 7 to press the other surface of the bending portion.

The pressing portion 77 is provided in the edge of the fixing member 7 and presses the other surface of the bending portion 41, 43 and 45 from the bottom.

A plurality of ribs as the pressing portion 77 may be provided to press the other surface of the bending portion, spaced a preset distance apart from each other.

The plurality of the ribs provided as the pressing portion 77 may reinforce the strength of the fixing member 7 and form an empty space between each two ribs, so that the weight of the fixing member 7 and the production cost can be reduced and saved.

Blowing agent is filled in the space formed between each two neighboring ribs and bond the fixing member 7 to the door panel 3.

The fixing member 7 may further include the support portion 79 supporting the inner surface of the door panel 3.

The support portion 79 is able to keep an external appearance as ' '-shape and prevent the fixing member 7 from shaking in the door panel 3.

The support portion 79 may be provided in a front or side end of the fixing member 7 to support an inner surface of the side door panel 33 as well as an inner surface of the front door panel 31.

The support portion 79 may be extended from the front or side end of the fixing member 7 downward and have a vertical cross section to surface-contact with the inner surface of the door panel 3.

The support portion 79 may be extended from the edge of the fixing member 7.

The support portion 79 may be extended from the pressing portion 77 downward.

Referring to FIG. 6, the refrigerator may include a fixing projection 501 projected from a lower surface of the cap panel 5 to fix the cap panel 5 and the fixing member 7 to each other; and a fixing groove 701 concavely provided in the fixing member 7 to have the fixing projection 501 inserted therein.

The fixing projection 501 may be provided in the lower surface of the cap panel 5 where the recess 6 is formed. The fixing groove 701 may be provided in the recess inserting portion 73 of the fixing member 7 where the recess 6 is inserted.

The fixing projection 501 may further include a hollow 503 having a screw thread formed in an inner circumferential surface; and a screw fastening hole 703 provided in the fixing groove 701 to make the hollow communicate with the internal space of the door panel 3.

When a worker insertedly puts and rotates a screw in the screw fastening hole 703, the screw is fastened to the screw thread of the hollow 503 provided in the fixing projection 501 and the cap panel 5 and the fixing member 7 are stably coupled to each other. In this instance, the bending portion 4 is fixedly disposed between the cap panel 5 and the fixing member 7.

Figure 7:
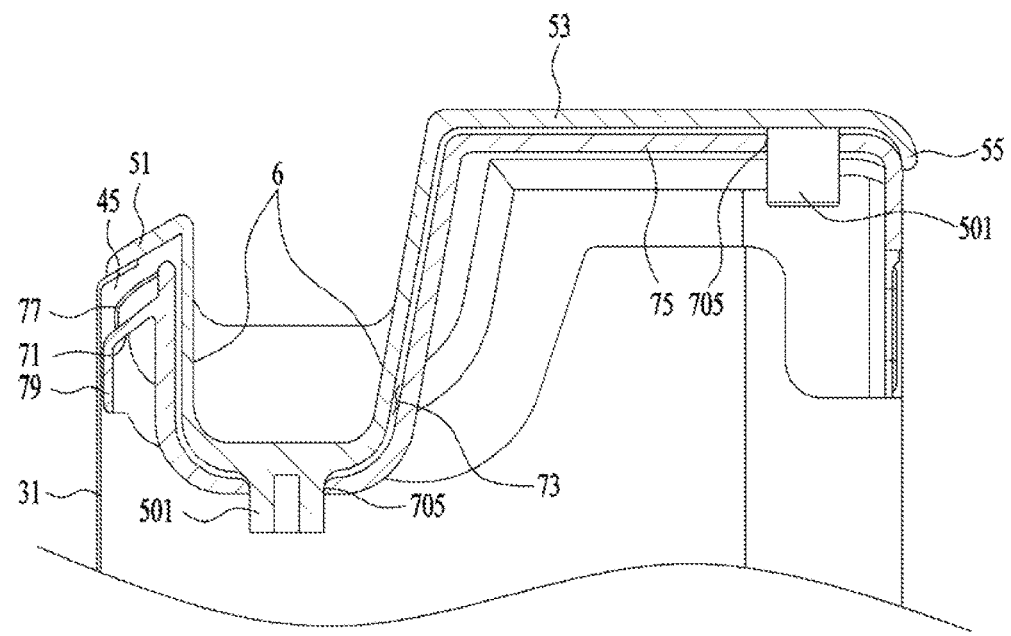
FIG. 7 is a diagram illustrating an example cap panel and an example fixing member.

FIG. 7 illustrates an example cap panel and an example fixing member.

Referring to FIG. 7, a penetrating hole 705 is further provided in the fixing member 7 to expose the cap panel 5 out to the internal space of the door panel 3 to as to fix the cap panel 5 and the fixing member 7 to each other.

When the blowing agent filled in the door panel 3 starts to blow, the cap panel 5 exposed through the penetrating hole 705 may be bonded to the blowing agent.

In case the blowing agent is blowing in the door panel 3, the fixing member 7 is pressed upward by the blowing pressure and the fixing member presses the bending portion 4 upward. The cap panel 5 exposed through the penetrating hole 705 is bonded and fixed by the blowing agent.

A fixing projection 501 projected from the lower surface of the cap panel 5 may be further provided.

The fixing projection 501 may be exposed to the internal space of the door panel 3 through the penetrating hole 705. Accordingly, a surface area of the cap panel 5 bonded to the blowing agent may be broadened.

A screw thread may be further provided in an outer circumferential surface of the fixing projection 501 as another example for fixing the cap panel 5 and the fixing member 7 to each other. The fixing projection may be exposed to the internal space of the door panel 3 through the penetrating hole 705 and a fastening material such as a bolt may be fastened to the outer circumferential surface of the fixing projection 501 so that the cap panel 5 and the fixing member 7 can be fixed to each other stably and that the bending portion 4 may be fixedly disposed between the cap panel 5 and the fixing member 7.

As another example for fixing the cap panel 5 and the fixing member to each other, an adhesive or adhesive tape may be provided between the cap panel 5 and the fixing member 7 to fix the cap panel 5 and the fixing member 7 to each other.

In this example, the cap panel 5 of the door may be fabricated by die casting molding.

The die casting molding is the process for fabricating products by casting low-molten metal into a precise shaped mold at a high pressure. The die casting molding is similar to injection molding and proper to metal products. Examples of low-molten metal include Al, Zn, Mg or alloys of them.

In some implementations, the cap panel 5 of the door can be fabricated with aluminum (Al) by die casting molding. As shown in FIGS. 5 through 7, such the die casting molding is proper to the complex shaped mold such as the cap panel 5 having the recess 6 with the closed side or the cap panel having the fixing projection 501 formed in the lower surface.

Figure 8:
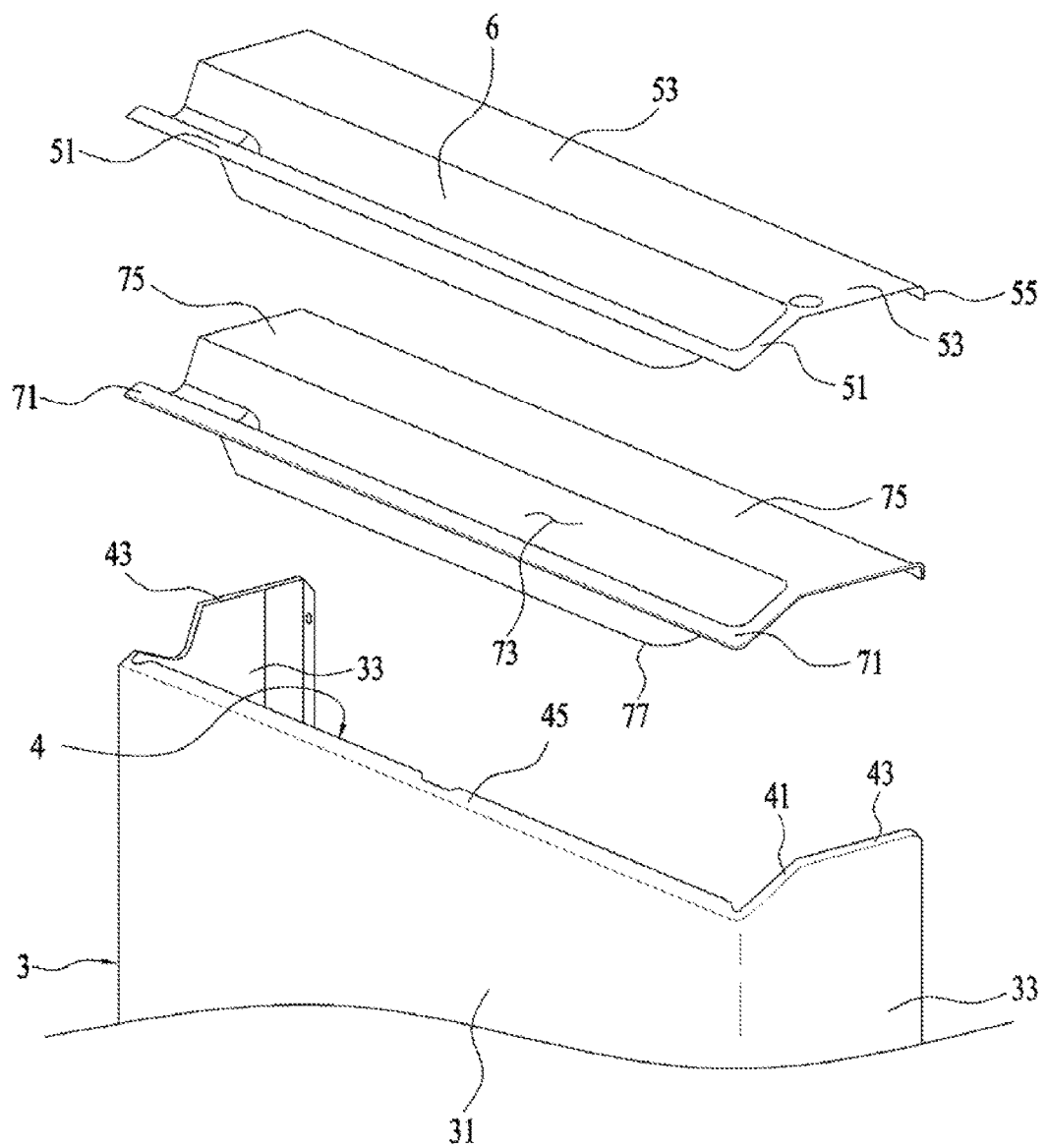
FIG. 8 is a diagram illustrating an example door of a refrigerator.
Figure 9:
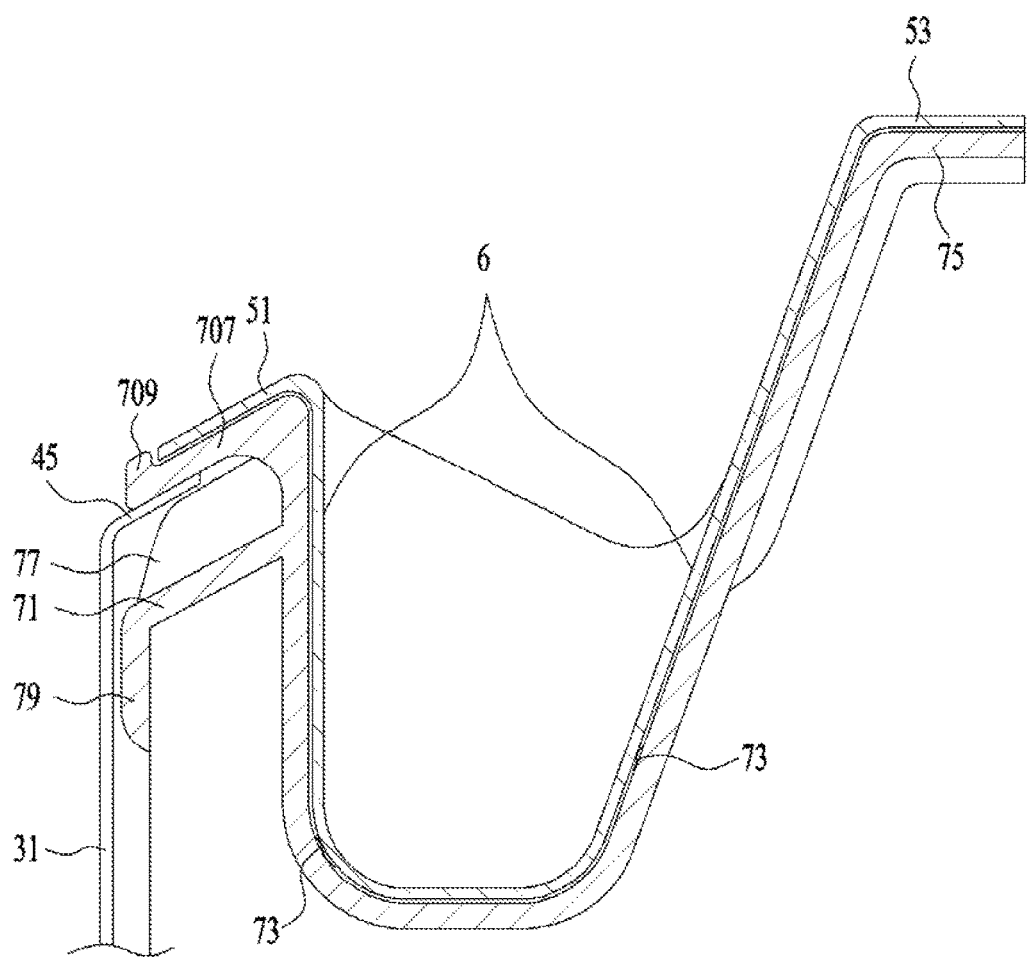
FIG. 9 is a diagram illustrating an example door of a refrigerator.

FIGS. 8-9 illustrate an example door of a refrigerator.

Referring to FIGS. 8-9, another example door of a refrigerator is described. The door includes the cap panel 5.

In some implementations, the cap panel 5 of the door may be fabricated by press die.

The press die means the molding method for forming metal products by installing a die in a press machine configured to reciprocate linearly.

If the cap panel 5 is fabricated by press die, it is difficult to fabricate the structure having the complex shape or projection and a cut surface is disadvantageously sharp. In contrast, the production cost is low and the production time is short advantageously.

The cap panel 5 may be also supported by the bending portion 4 of the door panel 3.

The fixing member 7 (or the pressing portion 77) may press the bending portion 4 in the internal space of the door panel 3.

The bending portion 4 may be fixedly arranged between the cap panel 5 and the fixing member 7.

The fixing member 7 (or the support portion 79) may support the inner surface of the door panel 3.

To fix the cap panel 5 and the fixing member 7 to each other may be applied the method of bonding the cap panel 5 to the blowing agent exposed through the fixing member 7 by providing the penetrating hole 705 in the fixing member 7 and another method of providing the adhesives or adhesive tape between the cap panel 5 and the fixing member 7.

In some implementations, the door may include a projecting portion 707 extended from the fixing member 7 and arranged between the cap panel 5 and the bending portion 4; and a stepped portion 709 stepped from one end of the projecting portion 707 and covering a cut surface of the cap panel 5. In some implementations, the fixing member 7 may include the projecting portion 707 and the stepped portion 709. The projecting portion 707 and the stepped portion 709 may be part of the fixing member 7.

The stepped portion 709 may be extended upward from the end of the protecting portion 707 and located on the same plane with the cap panel or higher than the thickness of the cap panel.

The stepped portion 709 may be provided as a groove for covering the end of the cap panel 5.

The protecting portion and the stepped portion prevent the user's hand from getting cut by the cut surface of the cap panel 5 when the user opens and closes.

The protecting portion 707 described in the example above can be applied to various other examples.

Figure 10:
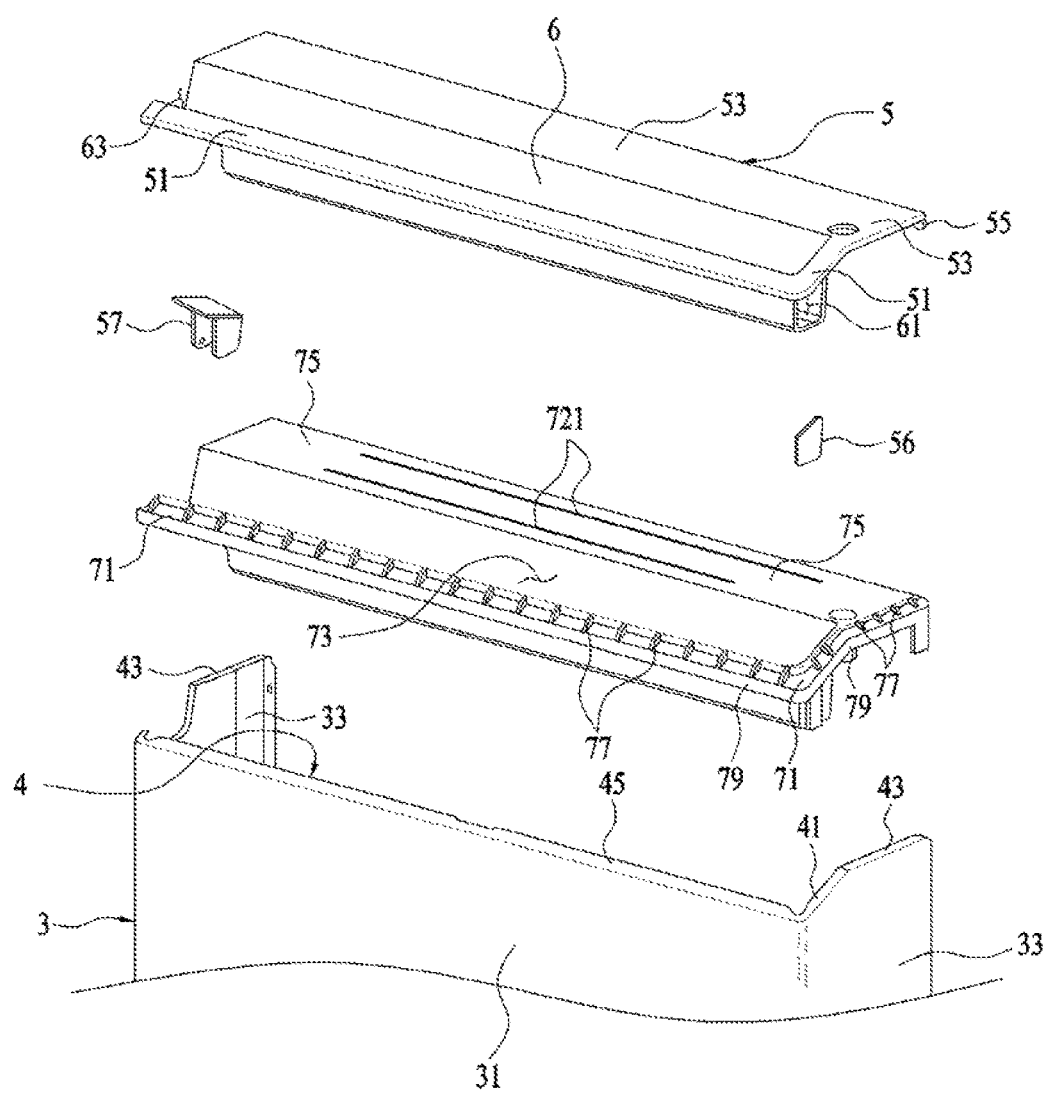
FIG. 10 is a diagram illustrating an example door of a refrigerator.
Figure 13:
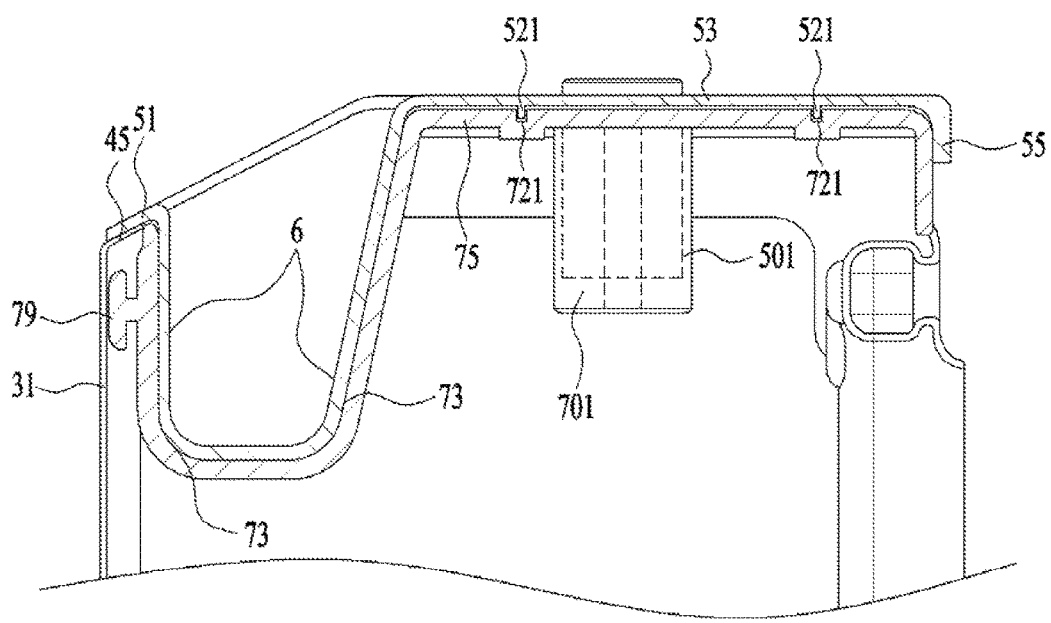
FIG. 13 is a diagram illustrating an example door of a refrigerator.

FIG. 10 illustrates an example door of a refrigerator. FIG. 11(a) illustrates the example door of FIG. 10. FIG. 11(b) illustrates example components of the example door of FIG. 11(a). FIG. 12(a) illustrates an example door of FIG. 10. FIG. 12(b) illustrates example components of the example door of FIG. 12(a). FIG. 13 illustrates an example door of a refrigerator.

Referring to FIGS. 10-13, another example door of a refrigerator is described.

As shown in FIG. 10, the door may include the cap panel 5.

The cap panel 5 of the door may be fabricated by extrusion molding.

The extrusion molding means the method for continuously extruding products from a die, using a screw, after heated and molten metal is supplied to a cylinder. For example, the extrusion molding is similar to the method of extruding a bar-like rice cake in Korea.

In case the cap panel 5 is fabricated by the extrusion molding, it is difficult to form the complex shape such as the concave or convex shape or the projection or the complex structure such as the structure with the blocked side. However, it is possible to fabricate products continuously and the production time is short with the low production cost.

The cap panel 5 may be also supported by the bending portion 4 of the door panel 3.

The fixing member 7 (or the pressing portion 77) may press the bending portion 4 in the internal space of the door panel 3.

The bending portion 4 may be fixedly arranged between the cap panel 5 and the fixing member 7.

The fixing member 7 (or the support portion 79) may support the inner surface of the door panel 3 (see FIG. 13).

To fix the cap panel 5 and the fixing member 7 to each other may be applied the method of bonding the cap panel 5 to the blowing agent exposed through the fixing member 7 by providing the penetrating hole 705 in the fixing member 7 and another method of providing the adhesives or adhesive tape between the cap panel 5 and the fixing member 7.

As shown in FIG. 10, the cap panel 5 includes the recess 6 functioning as the handle of the door.

The recess 6 may be concavely recessed from the first cap panel 51.

The top (the bottom in case the handle of the door is provided in the lower portion of the door) of the recess 6 may be open to allow the user's hand to insertedly put in.

A first opening 61 and a second opening 63 may be provided in right and left sides of the recess 6, respectively.

The door is fabricated by the extrusion molding and the cap panel 5 is fabricated only in a shape continuously formed in one direction.

Accordingly, the cross section of the cap panel in one direction is uniform.

In case the cap panel is formed by the extrusion molding, the recess 6 cannot help including the first opening 61 and the second opening 63 formed in the right and left sides of the recess 6.

In this instance, the first opening 61 and the second opening 63 may be provided in case of using other metal molding method and they are not formed only by the extrusion molding.

Figure 11:
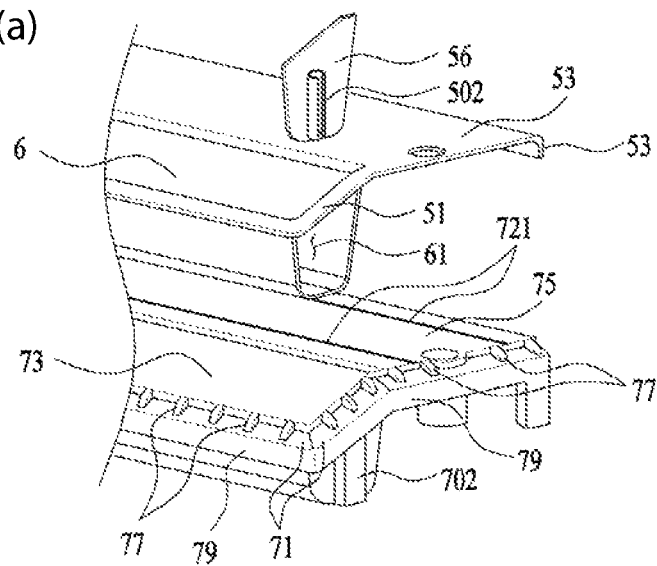
FIG. 11(a) is a diagram illustrating the example door of FIG. 10.
FIG. 11(b) is a diagram illustrating example components of the example door of FIG. 11(a).
Figure 11:
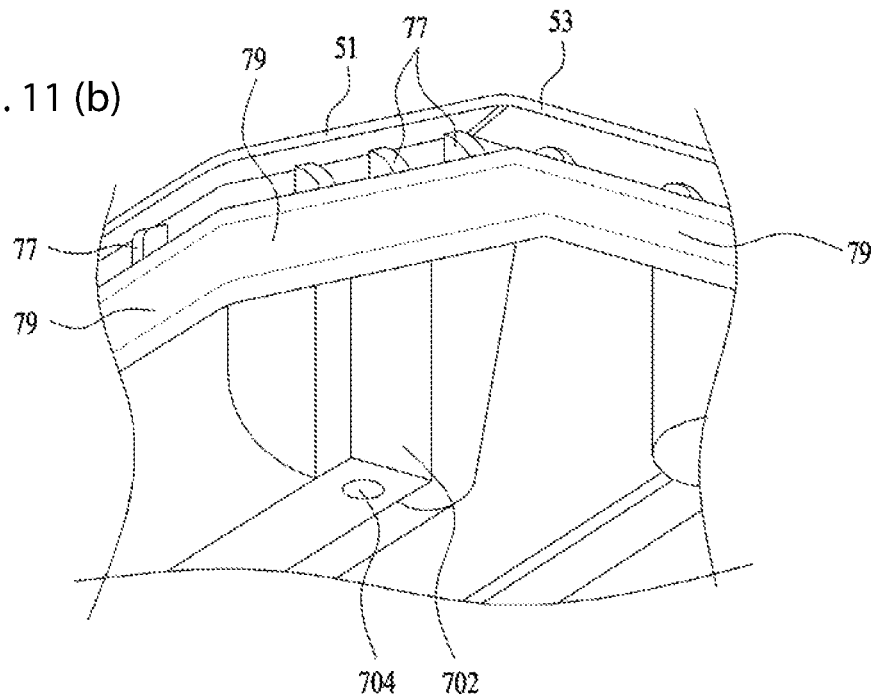

As shown in FIG. 11, the door may further include a fourth cap panel 56 for covering the first opening 61.

The fourth cap panel 56 may be formed in the same shape as the first opening 61 of the recess 6.

To fix the fourth cap panel 56 to the cap panel 5, the door may include an auxiliary fixing projection 502 provided in a side surface of the fourth cap panel 56; and an auxiliary fixing groove 702 provided in the recess inserting portion 73 of the fixing member 7 to insert the auxiliary fixing projection 502 therein.

When the cap panel 5 covers the top of the fixing member 7, the cap panel 5 including the recess 6 is inserted in the recess inserting portion 73.

The fourth cap panel 56 blocks the first opening 61 and the auxiliary fixing projection 502 of the fourth cap panel 56 is insertedly fitted in the auxiliary fixing groove 702 of the recess inserting portion 73.

A fastening material such as a bolt is fastened in the hollow provided in the auxiliary fixing projection 502, after penetrating the first auxiliary fastening hole 704 provided in the auxiliary fixing groove 702.

Accordingly, the first opening 61 is closed by the fourth cap panel 56.

In some implementations, as shown in FIG. 12, the door may further include a fifth cap panel 57 for covering the second opening 63.

The fifth cap panel 57 may be formed in the same shape as the second opening 62 of the recess 6.

To fix the fifth cap panel 57 to the cap panel 5, the door may include a fifth cap panel fastening hole 571 provided in the fifth cap panel 57; and a second auxiliary fastening hole 706 provided in the fixing member 7.

When the cap panel covers the top of the fixing member, the cap panel including the recess 6 is insertedly fitted in the recess inserting portion 73.

The fifth cap panel 57 covers the second opening to block the second opening 63, the fifth cap panel fastening hole 571 is in communication with the internal space of the door panel 3 via the second auxiliary fastening hole 706.

In this instance, a screw material such as a bolt may be fastened in the fifth cap panel fastening hole 571 via the second auxiliary fastening hole 706.

Accordingly, the second opening 63 is closed by the fifth cap panel 57.

As shown in FIG. 13, the door may further include a fixing rib 521 projected from the lower surface of the cap panel 5 downward convexly and provided in a right-and-left direction; and a fixing groove 721 concavely recessed from the top of the fixing member 7 in the right-and-left direction.

When the cap panel 5 is fixed to the top of the fixing member 7 in contact, the fixing rib 521 may be insertedly fitted in the fixing groove 721 and the cap panel 5 may be prevented from moving on the top of the fixing member 7 in the right-and-left direction.

A plurality of fixing ribs 521 and a plurality of fixing grooves 721 may be spaced a preset distance apart from each other in a back-and-forth direction.

The fixing rib 521 and the fixing groove 721 are shown with respect to FIGS. 10-13. In some implementations, the fixing ribs 521 and the fixing grooves 721 may be applied to the examples described with respect to FIGS. 5-6 and FIGS. 8-9.

What is claimed is:

1. A refrigerator comprising:
    a cabinet;
    a storage compartment that is located in the cabinet and that defines an interior area; and
    a door configured to cover the interior area of the storage compartment,
    wherein the door includes,
    a door panel that includes metal and that defines a first surface of the door and a second surface of the door;
    a bending portion that is bent from the door panel toward a first side of the door panel;
    a cap panel that includes metal, that defines a third surface of the door and a fourth surface of the door, that is coupled to the door panel and a first surface of the bending portion, and that includes a recess; and
    a fixing member that is configured to press a second surface of the bending portion and that is coupled to the cap panel,
    wherein the bending portion is configured to be pressed between the cap panel and the fixing member,
    wherein the fixing member includes a penetrating hole, a portion of the cap panel being exposed to an internal area of the door panel through the penetrating hole, and
    wherein the portion of the cap panel exposed through the penetrating hole is coupled to a blowing agent provided in the door panel.

2. The refrigerator of claim 1, wherein the fixing member includes a pressing portion configured to press the bending portion.

3. The refrigerator of claim 2, wherein the pressing portion includes a plurality of ribs.

4. The refrigerator of claim 1, wherein the fixing member includes a support portion configured to support an inner surface of the door panel.

5. The refrigerator of claim 1, wherein the bending portion includes:
    a first bending portion that is bent from the second surface of the door panel toward the first side of the door panel and that is slanted at a first angle;
    a second bending portion that is bent from the second surface of the door panel toward the first side of the door panel and that is slanted at a second angle; and
    a third bending portion that is bent from the first surface of the door panel toward the first side of the door panel, and
    wherein the cap panel includes:
    a first cap panel that is supported by the first bending portion and the third bending portion; and
    a second cap panel that is supported by the second bending portion.

6. The refrigerator of claim 5, wherein the first cap panel includes the recess.

7. The refrigerator of claim 6, wherein the recess is extended in parallel to the first surface of the door.

8. The refrigerator of claim 7, wherein a shape of the fixing member substantially corresponds to a shape of a first surface of the cap panel.

9. The refrigerator of claim 1, wherein the cap panel includes a fixing projection that is projected from a first surface of the cap panel,
    wherein the fixing member includes a fixing groove that is recessed in the fixing member, and
    wherein the fixing projection is configured to be inserted into the fixing groove.

* * * * *